No. 735,928. PATENTED AUG. 11, 1903.
J. H. WOOLSEY.
PENHOLDER.
APPLICATION FILED OCT. 29, 1902.
NO MODEL.
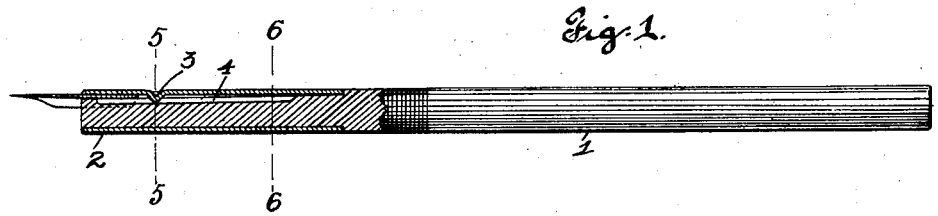
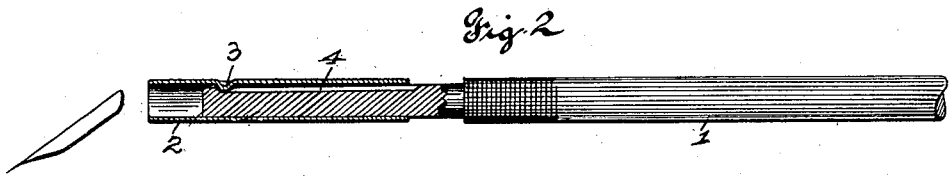
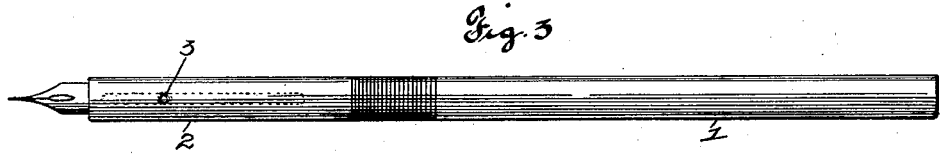
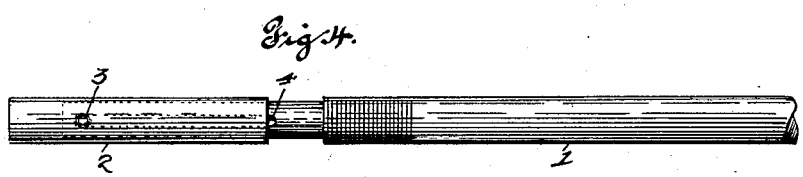
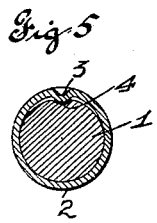
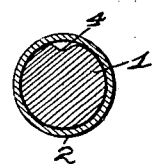
Witnesses
Alfred A. Eicks
M. S. Orion
Inventor
James H. Woolsey
by Higdon & Longan attys.
THE NORRIS PETERS CO., PHOTO-LITHO., WASHINGTON, D. C.

No. 735,928. Patented August 11, 1903.

UNITED STATES PATENT OFFICE.

JAMES H. WOOLSEY, OF ST. LOUIS, MISSOURI, ASSIGNOR TO ESSIE B. WOOLSEY, OF ST. LOUIS, MISSOURI.

PENHOLDER.

SPECIFICATION forming part of Letters Patent No. 735,928, dated August 11, 1903.

Application filed October 29, 1902. Serial No. 129,217. (No model.)

*To all whom it may concern:*

Be it known that I, JAMES H. WOOLSEY, of the city of St. Louis, State of Missouri, have invented certain new and useful Improvements in Penholders, of which the following is a full, clear, and exact description, reference being had to the accompanying drawings, forming a part hereof.

My invention relates to improvements in penholders; and it consists of the novel construction, combination, and arrangement of parts hereinafter shown, described, and claimed.

The object of this invention is to construct a penholder whereby the pen-point is gripped and rigidly held from lateral movement when placed in position.

Figure 1 is a combined side and sectional view of the penholder, showing the pen-point in position. Fig. 2 is a similar view as Fig. 1 with the ferrule in its outward position for releasing the point. Fig. 3 is a top plan view with the pen-point in position. Fig. 4 is a top plan view with the ferrule placed at its outward limit. Fig. 5 is a cross-sectional view taken on the line 5 5 of Fig. 1. Fig. 6 is a sectional view taken on the line 6 6 of Fig. 1.

In the construction of the device as shown I provide a staff 1, having on its one end a ferrule 2. In the ferrule 2 is formed an indentation 3, which is to fit within an elongated slot 4, formed in the staff 1, the purpose of which is to allow the ferrule longitudinal movement, at the same time preventing said ferrule from becoming detached from the staff. The portion of the staff upon which the ferrule is located has its upper portion in which the pen-point is to be placed slightly tapered, which is to permit the insertion of the pen-point between the ferrule and staff, and by forcing the ferrule rearwardly upon the staff it will grip and rigidly hold the pen-point in position and prevent lateral movement. In the drawings the ferrule is shown to be arranged flush with the remaining portion of the pen-staff; but I do not desire to limit myself to this precise construction, as the ferrule may be placed upon a staff constructed of the same diameter from end to end.

I claim—

A penholder, of the class described, having a pen-staff, the one end thereof being tapered, an elongated longitudinal slot formed in said staff, and a ferrule slidably mounted upon said staff, an indentation formed in said ferrule to fit within the elongated slot to allow lateral movement, and to prevent said ferrule from becoming detached, substantially as specified.

In testimony whereof I affix my signature in presence of two witnesses.

JAMES H. WOOLSEY.

Witnesses:
ALFRED A. EICKS,
M. G. IRION.